United States Patent
Zhu

(10) Patent No.: US 10,229,305 B2
(45) Date of Patent: Mar. 12, 2019

(54) TOUCH SCREEN, CONTROL METHOD THEREOF AND DISPLAY DEVICE

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 62 days.

(21) Appl. No.: 15/107,310

(22) PCT Filed: Jan. 22, 2016

(86) PCT No.: PCT/CN2016/071733
§ 371 (c)(1),
(2) Date: Jun. 22, 2016

(87) PCT Pub. No.: WO2017/008495
PCT Pub. Date: Jan. 19, 2017

(65) Prior Publication Data
US 2017/0206392 A1    Jul. 20, 2017

(30) Foreign Application Priority Data

Jul. 15, 2015 (CN) .......................... 2015 1 0415706

(51) Int. Cl.
| G06K 9/00 | (2006.01) |
| G06F 3/041 | (2006.01) |
| G06F 3/044 | (2006.01) |
| G06F 21/32 | (2013.01) |
| G06F 3/0488 | (2013.01) |

(52) U.S. Cl.
CPC .......... *G06K 9/0002* (2013.01); *G06F 3/044* (2013.01); *G06F 3/0416* (2013.01);
(Continued)

(58) Field of Classification Search
CPC ...... G06F 3/044; G06F 3/0416; G06F 3/0412; G06F 3/041; G06K 9/0002; G06K 9/00006; G06K 9/0004; G06K 9/00087
See application file for complete search history.

(56) References Cited

U.S. PATENT DOCUMENTS

| 2013/0181949 A1 | 7/2013 | Setlak |
| 2013/0279769 A1* | 10/2013 | Benkley ............. G06K 9/00013 382/124 |

(Continued)

FOREIGN PATENT DOCUMENTS

| CN | 102566840 A | 7/2012 |
| CN | 202771445 U | 3/2013 |

(Continued)

OTHER PUBLICATIONS

International Search Report dated Apr. 12, 2016 corresponding to International application No. PCT/CN2016/071733.
(Continued)

*Primary Examiner* — Kenny A Cese
(74) *Attorney, Agent, or Firm* — Nath, Goldberg & Meyer; Joshua B. Goldberg

(57) ABSTRACT

The present invention provides a touch screen, a control method thereof and a display device. The touch screen comprises a touch area used for touch display. A plurality of fingerprint identification elements are provided in the touch area and are configured to identify a fingerprint. The touch area includes a plurality of sub-areas, and the fingerprint identification elements located in each sub-area independently identify a fingerprint or a part of a fingerprint in the sub-area.

16 Claims, 7 Drawing Sheets

(52) U.S. Cl.
CPC .......... *G06F 3/04886* (2013.01); *G06F 21/32* (2013.01); *G06K 9/00087* (2013.01); *G06F 2203/04103* (2013.01)

(56) References Cited

U.S. PATENT DOCUMENTS

| | | | | |
|---|---|---|---|---|
| 2014/0129843 | A1* | 5/2014 | Shi | G06F 21/32 713/182 |
| 2015/0177884 | A1 | 6/2015 | Han | |
| 2016/0132712 | A1* | 5/2016 | Yang | G06K 9/0002 348/77 |
| 2016/0170522 | A1* | 6/2016 | Slobodin | G06F 3/044 345/174 |
| 2016/0210494 | A1 | 7/2016 | Zhao | |

FOREIGN PATENT DOCUMENTS

| | | |
|---|---|---|
| CN | 104049828 A | 9/2014 |
| CN | 104318222 A | 1/2015 |
| CN | 104484663 A | 4/2015 |
| CN | 104699306 A | 6/2015 |
| CN | 104932753 A | 9/2015 |

OTHER PUBLICATIONS

Written Opinion of the International Searching Authority dated Apr. 12, 2016 corresponding to International application No. PCT/CN2016/071733.

Office Action dated Aug. 2, 2017 issued in corresponding Chinese Application No. 201510415706.9.

* cited by examiner

TOUCH SCREEN, CONTROL METHOD THEREOF AND DISPLAY DEVICE

This is a National Phase Application filed under 35 U.S.C. 371 as a national stage of PCT/CN2016/071733, filed Jan. 22, 2016, an application claiming the benefit of Chinese Application No. 201510415706.9, filed Jul. 15, 2015, the content of each of which is hereby incorporated by reference in its entirety.

FIELD OF THE INVENTION

The present invention relates to the field of touch display technology, and particularly relates to a touch screen, a control method thereof, and a display device.

BACKGROUND OF THE INVENTION

At present, fingerprint identification technology begins to be applied to mobile devices, such as a mobile phone. Such fashionable technology is expected to lead a new revolution in the fields of password and mobile payment.

A working principle of application of the fingerprint identification technology to a touch screen of a mobile phone comprises firstly collecting a fingerprint by a fingerprint collection unit and generating a fingerprint image from the collected fingerprint, then processing the fingerprint image and extracting fingerprint feature points, and finally comparing the fingerprint feature points with fingerprint authentication information stored in the mobile phone, and unlocking the touch screen or enabling next operation on the touch screen when a result of the comparison indicates that the fingerprint feature points are consistent with the fingerprint authentication information.

However, in current fingerprint identification, a fingerprint identification device is usually arranged in a specific position outside a display screen of the mobile phone, such as on a function key of the mobile phone or in a specific position on a rear cover plate of the mobile phone, so that touch control through fingerprint can only be carried out in the specific position on the mobile phone, which has low requirements of function and processing speed of a fingerprint touch driving chip, but imposes great spatial and directional limitations on the touch control of the mobile phone through fingerprint, thereby restricting freedom of a finger during the touch control, and making it impossible to carry out the touch control through fingerprint flexibly and freely.

SUMMARY OF THE INVENTION

In view of the aforesaid technical problem existing in the prior art, the present invention provides a touch screen, a control method thereof and a display device. By arranging fingerprint identification elements in a touch area of the touch screen, touch control through fingerprint can be carried out on the touch screen more conveniently and more freely, and is no longer limited to a particular key outside the touch screen, so that the touch control through fingerprint on the touch screen can be carried out more flexibly and more freely, a user can gain better touch experience and touch efficiency of the touch screen can be increased.

An aspect of the present invention provides a touch screen, comprising a touch area used for touch display, and a plurality of fingerprint identification elements are provided in the touch area and are configured to identify a fingerprint. The touch area includes a plurality of sub-areas, and the fingerprint identification elements located in each sub-area independently identify a fingerprint or a part of a fingerprint in the sub-area.

According to embodiments of the present invention, each sub-area may have such a size that a fingerprint of one finger can be accommodated in the sub-area.

According to the embodiments of the present invention, a first control unit may be arranged in each sub-area, and is configured to select N fingerprint identification elements from all of the fingerprint identification elements in the sub-area to perform fingerprint detection. When at least one of the selected N fingerprint identification elements detects a fingerprint, the first control unit can control all of the fingerprint identification elements in the sub-area to perform fingerprint detection. When none of the selected N fingerprint identification elements detects a fingerprint, the first control unit can control other fingerprint identification elements in the sub-area not to perform fingerprint detection.

According to the embodiments of the present invention, the N fingerprint identification elements may be uniformly distributed in the sub-area, wherein, $9 \leq N \leq 12$, and N is an integer.

According to the embodiments of the present invention, a second control unit may be arranged in the touch area, and is configured to extract fingerprint detection information provided by each sub-area so as to obtain final fingerprint identification information.

According to the embodiments of the present invention, when a fingerprint is located in only one sub-area, the second control unit can extract fingerprint detection information of the sub-area so as to obtain final fingerprint identification information; when a fingerprint is located in two sub-areas, the second control unit can compare areas of the fingerprint in the two sub-areas, when a ratio of an absolute value of a difference between the areas of the fingerprint in the two sub-areas to a total area of the fingerprint is greater than a preset threshold, the second control unit can merely extract fingerprint detection information of the sub-area having a larger area of the fingerprint so as to obtain final fingerprint identification information, when the ratio of the absolute value of the difference between the areas of the fingerprint in the two sub-areas to the total area of the fingerprint is less than or equal to the preset threshold, the second control unit can extract and summarize fingerprint detection information of the two sub-areas so as to obtain the final fingerprint identification information; and when a fingerprint is located in three or more sub-areas, the second control unit can extract and summarize fingerprint detection information of all of the sub-areas in which the fingerprint is located, so as to obtain final fingerprint identification information.

According to the embodiments of the present invention, the touch screen may further comprise an authentication unit, which is connected to the second control unit, and is configured to compare the final fingerprint identification information obtained by the second control unit with fingerprint authentication information stored in the authentication unit.

According to the embodiments of the present invention, each fingerprint identification element may comprise fingerprint identification electrodes, a capacitance signal produced between the fingerprint identification electrode and a finger pressed thereon may be the fingerprint detection information, and a fingerprint image generated based on the fingerprint detection information may be the final fingerprint identification information.

According to the embodiments of the present invention, the touch screen may further comprise touch electrodes arranged in a matrix including a plurality of rows and a plurality of columns, and the fingerprint identification electrodes are the touch electrodes.

According to the embodiments of the present invention, when no fingerprint collection is carried out, the touch electrodes in every n rows may be used for collecting a touch signal within a touch period, wherein, $8 \leq n \leq 10$, and n is an integer.

According to the embodiments of the present invention, the fingerprint identification electrode may be rectangular, and the sides thereof fall within a size range of 50 μm to 200 μm.

According to the embodiments of the present invention, the touch area may include a plurality of zones which provide different touch functions, and a part of the plurality of sub-areas are distributed in each zone. Fingerprint authentication information corresponding to each zone may be stored in the authentication unit.

Another aspect of the present invention provides a display device, comprising the touch screen according to the present invention.

Another aspect of the present invention provides a control method of a touch screen, the touch screen comprises a touch area, which is provided with a plurality of fingerprint identification elements and is divided into a plurality of sub-areas, and the method comprises steps of: independently identifying a fingerprint or a part of a fingerprint in each sub-area by the fingerprint identification elements located in the sub-area; and performing touch display through the touch area.

According to the embodiments of the present invention, each sub-area may have such a size that a fingerprint of one finger can be accommodated in the sub-area.

According to the embodiments of the present invention, the step of independently identifying a fingerprint or a part of a fingerprint in each sub-area by the fingerprint identification elements located in the sub-area may comprise selecting N fingerprint identification elements from all of the fingerprint identification elements in the sub-area to perform fingerprint detection; enabling all of the fingerprint identification elements in the sub-area to perform fingerprint detection when at least one of the selected N fingerprint identification elements detects a fingerprint; and preventing other fingerprint identification elements in the sub-area from performing fingerprint detection when none of the selected N fingerprint identification elements detects a fingerprint.

According to the embodiments of the present invention, the N fingerprint identification elements may be uniformly distributed in the sub-area, wherein, $9 \leq N \leq 12$, and N is an integer.

According to the embodiments of the present invention, the method may further comprise a step of extracting fingerprint detection information provided by each sub-area so as to obtain final fingerprint identification information.

According to the embodiments of the present invention, the step of extracting fingerprint detection information provided by each sub-area may comprise: when a fingerprint is located in only one sub-area, extracting fingerprint detection information of the sub-area so as to obtain final fingerprint identification information; when a fingerprint is located in two sub-areas, comparing areas of the fingerprint in the two sub-areas, merely extracting fingerprint detection information of the sub-area having a larger area of the fingerprint so as to obtain final fingerprint identification information when a ratio of an absolute value of a difference between the areas of the fingerprint in the two sub-areas to a total area of the fingerprint is greater than a preset threshold, or extracting and summarizing fingerprint detection information of the two sub-areas so as to obtain the final fingerprint identification information when the ratio of the absolute value of the difference between the areas of the fingerprint in the two sub-areas to the total area of the fingerprint is less than or equal to the preset threshold; and when a fingerprint is located in three or more sub-areas, extracting and summarizing fingerprint detection information of all of the sub-areas in which the fingerprint is located, so as to obtain final fingerprint identification information.

According to the embodiments of the present invention, the method may further comprise a step of comparing the obtained final fingerprint identification information with stored fingerprint authentication information.

According to the embodiments of the present invention, the method may further comprise steps of dividing the touch area into a plurality of zones which provide different touch functions, wherein, a part of the plurality of sub-areas are distributed in each zone; and independently performing fingerprint authentication in each zone.

In the touch screen provided by the present application, by arranging the fingerprint identification elements in the touch area, touch control through fingerprint can be carried out on the touch screen more conveniently and more freely, and is no longer limited to a particular key outside the touch screen, so that the touch control through fingerprint on the touch screen can be carried out more flexibly and more freely, a user can gain better touch experience and touch efficiency of the touch screen can be increased.

BRIEF DESCRIPTION OF THE DRAWINGS

In order to illustrate the technical solutions in the embodiments of the present invention more clearly, each embodiment of the present invention will be described in detail below with reference to the accompanying drawings. It should be understood that the following description is given merely for illustrating the embodiments of the present invention, but does not make limitation to the scope of the present invention. Those of ordinary skill in the art can make modifications and changes to the embodiments without departing from the scope of the present invention. In the drawings.

DETAILED DESCRIPTION OF THE EMBODIMENTS

In order to make those skilled in the art better understand the technical solutions of the present invention, a touch screen, a control method thereof and a display device provided by the present invention will be further described in detail below with reference to the accompanying drawings and specific implementations.

Figure 1:
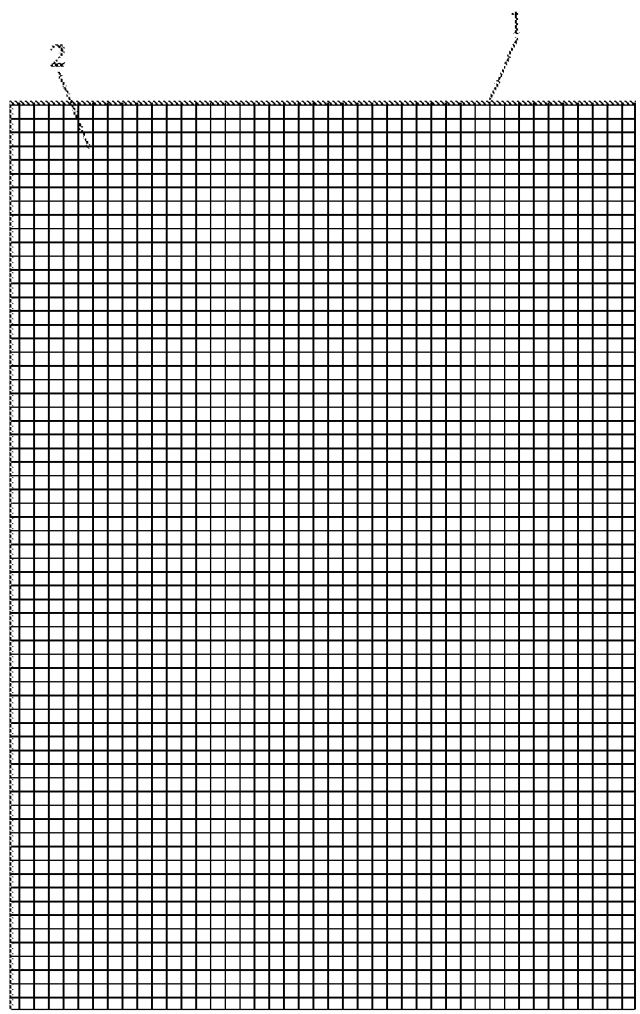
FIG. 1 schematically shows a touch area of a touch screen according to the embodiments of the present invention.
Figure 2:
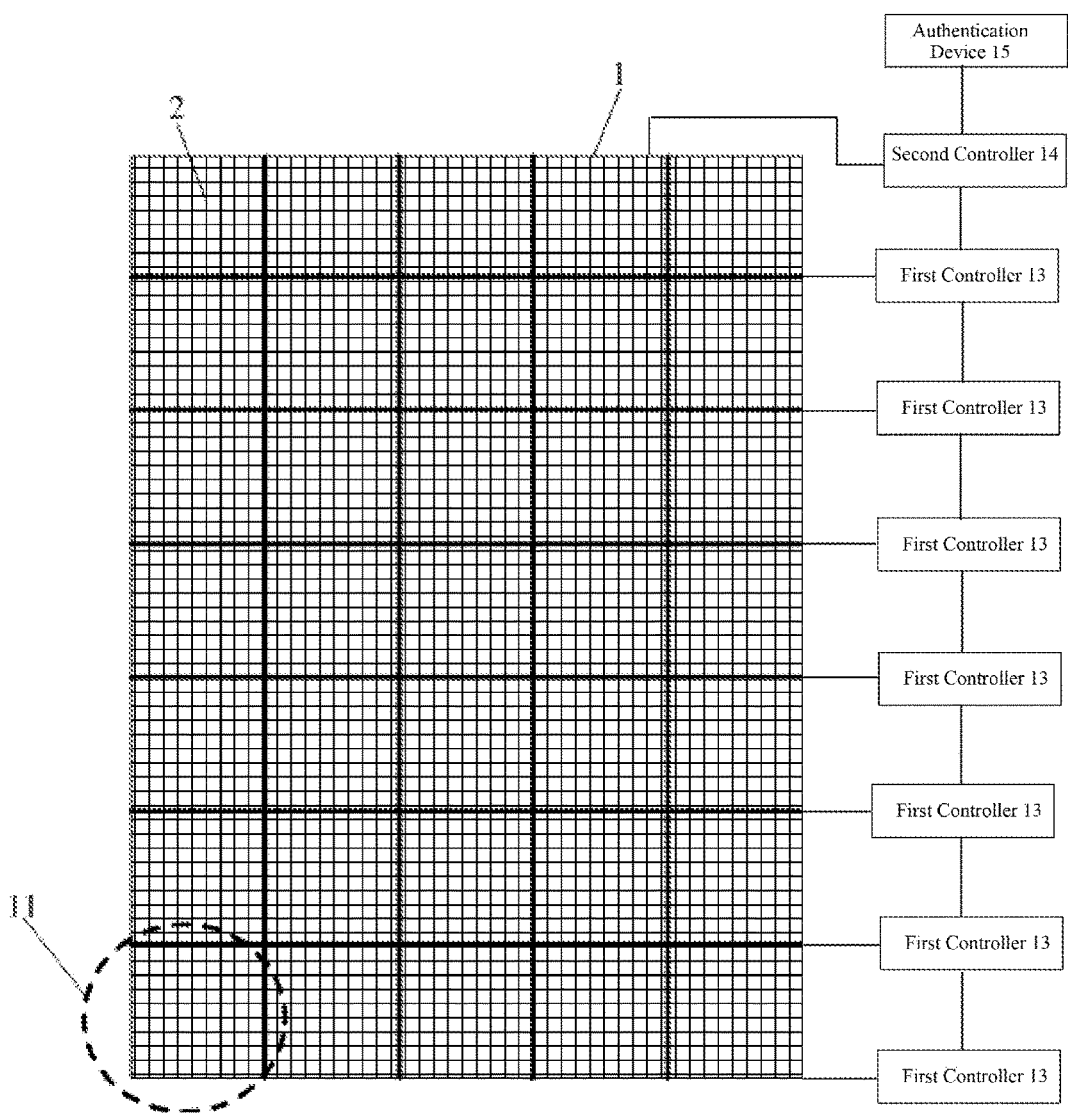
FIG. 2 is a schematic diagram of the touch area of the touch screen in FIG. 1 which is divided into sub-areas.

FIG. 1 schematically shows a touch area of a touch screen according to the embodiments of the present invention, and FIG. 2 is a schematic diagram of the touch area of the touch screen in FIG. 1 which is divided into sub-areas.

As shown in FIG. 1, the touch screen according to the embodiments of the present invention comprises a touch area 1 which is provided with a plurality of fingerprint identification elements 2 configured to identify a fingerprint.

By arranging the fingerprint identification elements 2 in the touch area 1, touch control through fingerprint can be carried out on the touch screen more conveniently and more freely, and is no longer limited to a particular key outside the touch screen, so that the touch control through fingerprint on the touch screen can be carried out more flexibly and more freely, and a user can gain better touch experience.

The touch area 1 is used for touch display, and may be an entire touch surface of the touch screen. According to the embodiments of the present invention, resolution of the fingerprint identification elements 2 may be above 500 dpi, and indicates distribution density of the fingerprint identification elements 2. Such setting can ensure high fingerprint identification accuracy of the fingerprint identification elements 2, so as to realize more accurate and clearer fingerprint identification in the touch area 1. It should be noted that no limitation is made to a range of the resolution of the fingerprint identification elements 2 in the present invention, as long as the resolution of the fingerprint identification elements 2 is adequate for fingerprint identification.

Alternatively, the touch area 1 may be a part of the touch surface of the touch screen.

According to the embodiments of the present invention, as shown in FIG. 2, the touch area 1 includes a plurality of sub-areas 11, and the fingerprint identification elements 2 located in each sub-area 11 independently identify a fingerprint or a part of a fingerprint in the sub-area 11.

According to one embodiment of the present invention, each sub-area 11 has the same size and the same shape, and the sub-area 11 may have such a size (for example, 1.5 cm×1.5 cm) that a fingerprint of one finger can be accommodated in the sub-area 11. Such setting allows touch control through fingerprint in the whole touch area 1, and further improves spatial and directional freedom degrees of the touch control through fingerprint, that is, all the sub-areas 11 can operate independent of each other. So, touch efficiency of the whole touch area 1 is increased, and freedom of the touch control through fingerprint and user's experience are improved.

According to the embodiments of the present invention, a first control unit (not shown) may be arranged in each sub-area 11, and is configured to select N fingerprint identification elements 2 from all of the fingerprint identification elements 2 in the sub-area 11 to perform fingerprint detection. When at least one of the selected N fingerprint identification elements 2 detects a fingerprint, the first control unit controls all of the fingerprint identification elements 2 in the sub-area 11 to perform fingerprint detection. When none of the selected N fingerprint identification elements 2 detects a fingerprint, the first control unit controls other fingerprint identification elements 2 in the sub-area 11 not to perform fingerprint detection. That is to say, the first control unit in each sub-area 11 can independently control the sub-area 11 to or not to perform fingerprint detection.

The N fingerprint identification elements 2 in the sub-area 11 are uniformly distributed in the sub-area 11, so as to avoid missed detection of a fingerprint part within the sub-area 11 to a great extent, thereby improving completeness and accuracy of fingerprint identification.

By dividing the whole touch area 1 into a plurality of sub-areas 11, a fingerprint is generally located within one or a few sub-areas 11 during fingerprint detection. Preliminary fingerprint detection is carried out by the selected N fingerprint identification elements 2 in the sub-area 11, and it can be determined that no fingerprint is located in the sub-area 11 when none of the selected N fingerprint identification elements 2 detects a fingerprint. Under the control of the first control unit, fingerprint detection is not carried out in the sub-area 11 having no fingerprint, but is only carried out in the sub-area 11 having a fingerprint, which can increase detection efficiency and save power consumption required for fingerprint detection.

Given that the sub-area 11 has such a size that a fingerprint of one finger can be accommodated in the sub-area 11, a range of N may be $9 \leq N \leq 12$ based on experiments, which not only avoids missed detection of a fingerprint or a fingerprint part within each sub-area 11, but also increases detection efficiency and saves power consumption.

According to the embodiments of the present invention, the whole touch area 1 may be provided with a second control unit (not shown) which is configured to extract fingerprint detection information provided by each sub-area 11 so as to obtain final fingerprint identification information. The final fingerprint identification information is complete fingerprint information obtained from the touch area 1.

Figure 3:
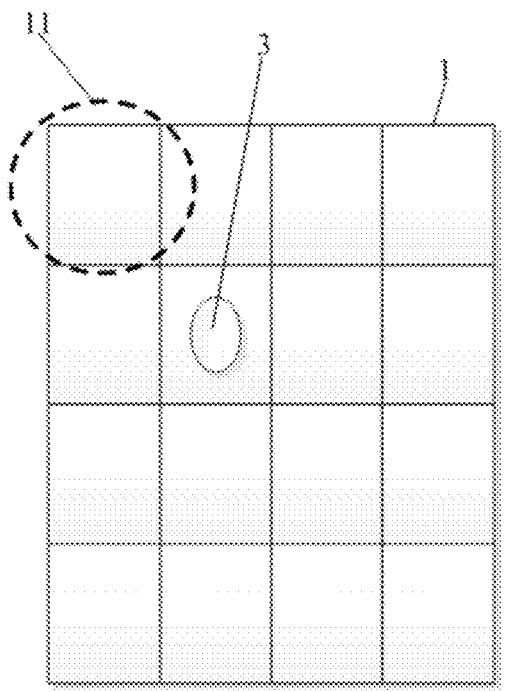
FIG. 3 is a schematic diagram of the case that a fingerprint is located in only one sub-area.
Figure 4:
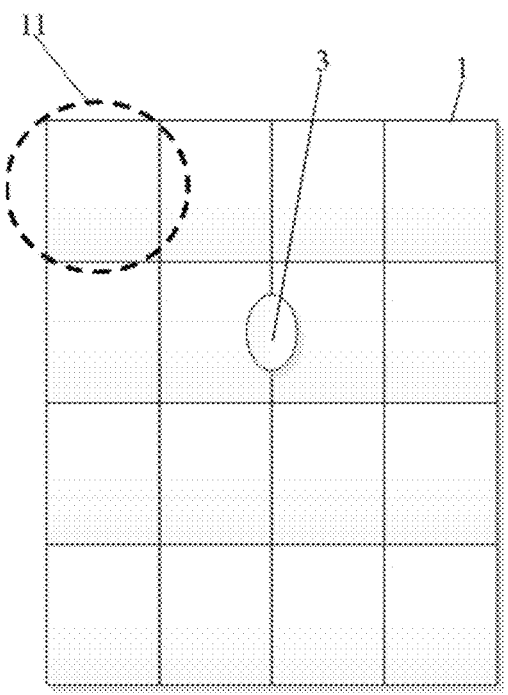
FIG. 4 is a schematic diagram of the case that a fingerprint extends across two sub-areas.
Figure 5:
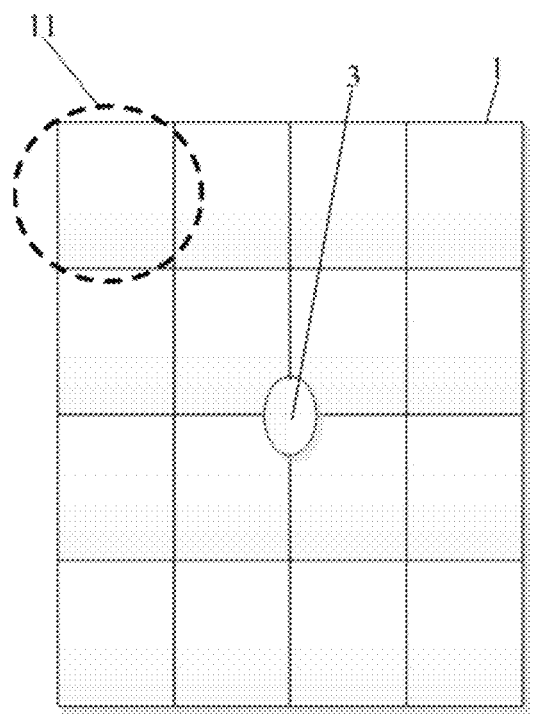
FIG. 5 is a schematic diagram of the case that a fingerprint extends across three or more sub-areas.
Figure 6:
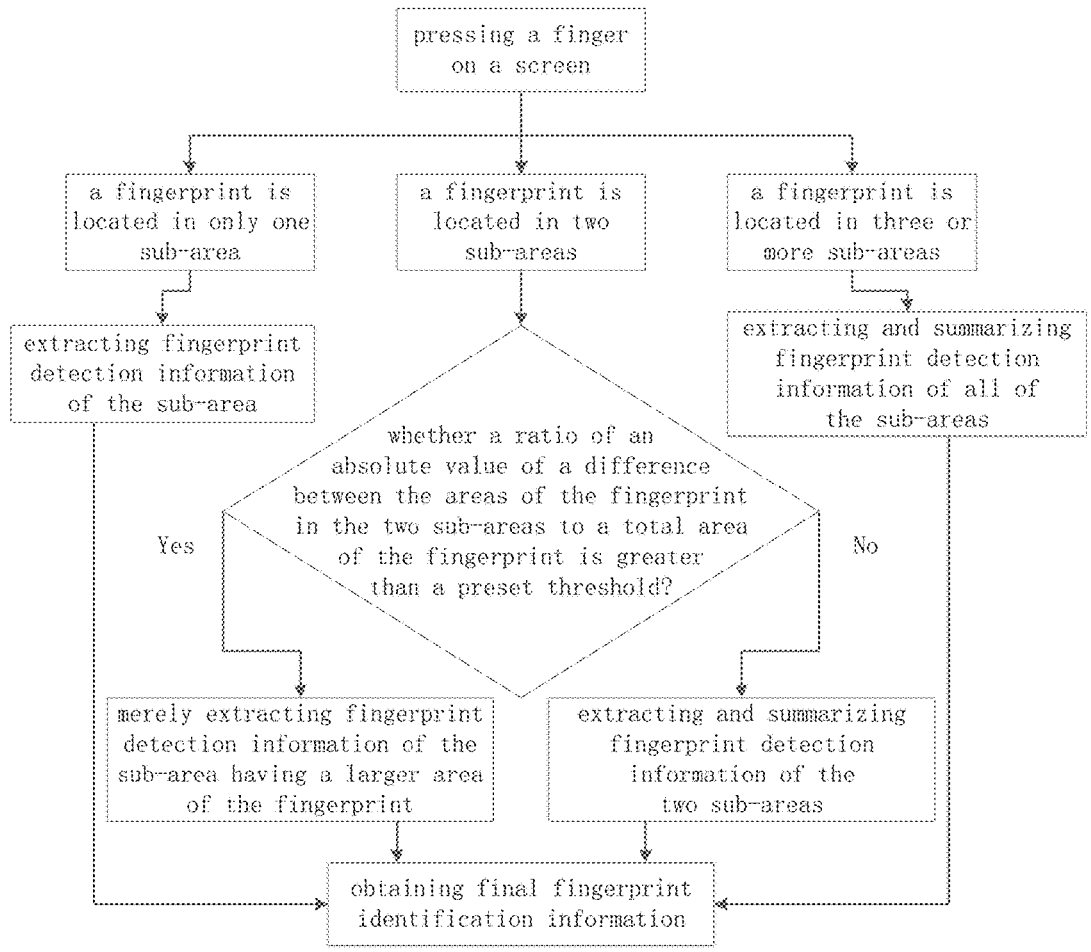
FIG. 6 is a flow diagram of extracting fingerprint detection information according to the embodiments of the present invention.

FIGS. 3-5 are schematic diagrams of the cases that a fingerprint is located in different numbers of sub-areas, and FIG. 6 is a flow diagram of extracting fingerprint detection information according to the embodiments of the present invention.

With reference to FIGS. 3-6, when a fingerprint 3 is located in only one sub-area 11 (as shown in FIG. 3), the second control unit extracts fingerprint detection information of the sub-area 11 which is considered as the obtained final fingerprint identification information.

When a fingerprint 3 is located in two sub-areas 11 (as shown in FIG. 4), the second control unit compares areas of the fingerprint 3 in the two sub-areas 11, when a ratio of an absolute value of a difference between the areas of the fingerprint 3 in the two sub-areas 11 to a total area of the fingerprint 3 is greater than a preset threshold (for example, when the ratio of the absolute value of the difference between the areas of the fingerprint 3 in the two sub-areas 11 to the total area of the fingerprint 3 is greater than 20%), the second control unit merely extracts fingerprint detection information of the sub-area 11 having a larger area of the fingerprint so as to obtain final fingerprint identification information; when the ratio of the absolute value of the difference between the areas of the fingerprint 3 in the two sub-areas 11 to the total area of the fingerprint 3 is less than or equal to the preset threshold (for example, when the ratio of the absolute value of the difference between the areas of the fingerprint 3 in the two sub-areas 11 to the total area of the fingerprint 3 is less than or equal to 20%), the second control unit extracts and summarizes fingerprint detection information of the two sub-areas 11 so as to obtain the final fingerprint identification information. It should be noted that in the case that the fingerprint 3 is located in two sub-areas 11, information of a larger part of the fingerprint 3 is adequate for identification of the fingerprint 3 when the absolute value of the difference between the areas of the fingerprint 3 in the two sub-areas 11 is larger than 20% of the total area of the fingerprint 3.

When a fingerprint 3 is located in three or more sub-areas 11, the second control unit extracts and summarizes fingerprint detection information of all of the sub-areas 11 in which the fingerprint is located, so as to obtain final fingerprint identification information.

According to the embodiments of the present invention, the touch screen may further comprise an authentication unit (not shown), which is connected to the second control unit, and is configured to compare the final fingerprint identification information obtained by the second control unit with fingerprint authentication information stored in the authentication unit. When a result of the comparison indicates that the final fingerprint identification information is consistent with the fingerprint authentication information, a user, who provides the final fingerprint identification information, can be allowed to perform touch operation on the touch screen. For avoiding interference between fingerprint detection operation and touch control operation, according to the embodiments of the present invention, a feasible operation way is that a touch function of the touch screen is paused during fingerprint identification, and is restored after the fingerprint identification.

According to the embodiments of the present invention, each fingerprint identification element 2 is connected with the second control unit, and may comprise fingerprint identification electrodes. A capacitance signal can be produced between the fingerprint identification electrode and a finger pressed thereon, and a fingerprint image can be generated based on the capacitance signal. Therefore, the capacitance signal produced between the fingerprint identification electrode and the finger pressed thereon can be considered as the fingerprint detection information, and the fingerprint image generated based on the fingerprint detection information can be considered as the final fingerprint identification information.

Figure 7:
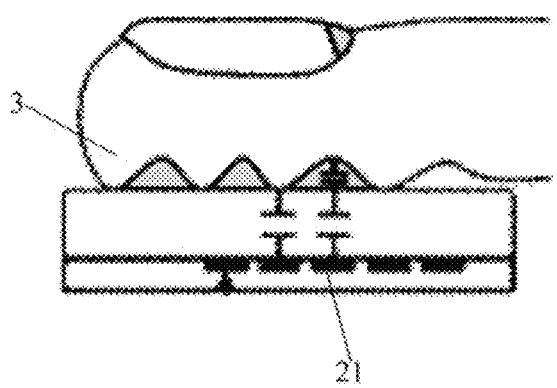
FIG. 7 is a schematic diagram of principle of capacitive fingerprint collection.

FIG. 7 is a schematic diagram of principle of capacitive fingerprint collection. As shown in FIG. 7, the fingerprint 3 is uneven, when the fingerprint 3 comes close to the fingerprint identification electrodes 21, capacitances produced between convex points and concave points of the fingerprint 3 and each fingerprint identification electrode 21 are different due to different distances therebetween. An image of the fingerprint 3 can be generated according to the magnitudes of the capacitances in different positions (that is, the fingerprint detection information acquired through each fingerprint identification electrode 21), and serve as the final fingerprint identification information.

According to the embodiments of the present invention, touch electrodes of the touch screen may be used as the fingerprint identification electrodes 21. According to the embodiments of the present invention, the touch screen may comprise touch electrodes arranged in a matrix including a plurality of rows and a plurality of columns. The touch electrodes are made of transparent conductive material.

It should be noted that detection accuracy for touch control operation is not required to be adequate for fingerprint detection, so that the touch electrodes, which are arranged in a plurality of rows and a plurality of columns, in every n rows can be used for collecting a touch signal within a touch period so as to reduce power consumption during the touch control, wherein, $8 \leq n \leq 10$, and n is an integer.

Alternately, the touch electrodes may not be multiplexed as the fingerprint identification electrodes 21, and the fingerprint identification electrodes 21 may be formed on the touch screen separately.

According to the embodiments of the present invention, the fingerprint identification electrode 21 may be in a shape of rectangle, and the sides thereof may fall within a size range of 50 μm to 200 μm. The fingerprint identification electrodes 21 may be formed by means of inkjet printing. The fingerprint identification electrodes 21 formed by means of inkjet printing can have higher accuracy, so that the fingerprint identification electrodes 21 within the aforesaid size range can perform accurate detection of the fingerprint 3.

Figure 8:
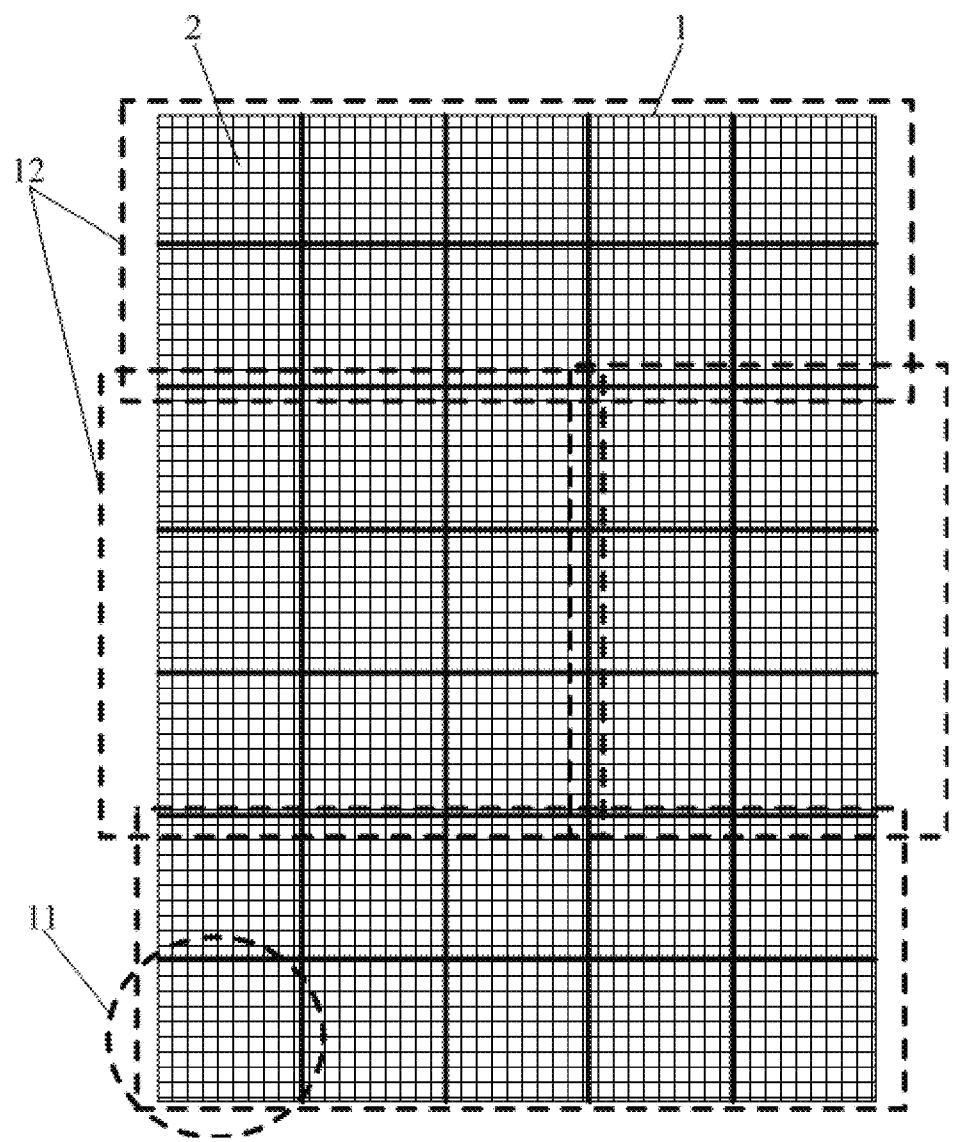
FIG. 8 is a schematic diagram of the touch area of the touch screen in FIG. 1 which is divided into zones.

FIG. 8 is a schematic diagram of the touch area of the touch screen in FIG. 1 which is divided into zones.

According to the embodiments of the present invention, as shown in FIG. 8, the touch area 1 may include a plurality of zones 12 which provide different touch functions, and a part of the plurality of sub-areas 11 are distributed in each zone 12. Fingerprint authentication information corresponding to each zone 12 may be stored in the authentication unit. That is to say, the touch area 1 is divided into a plurality of zones 12 which provide different touch functions, and fingerprint authentication is independently carried out in each zone. For example, as shown in FIG. 8, the touch area 1 is divided into four zones 12. Different functions can be provided by carrying out touch control in each zone 12, for example, the touch control in an upper zone 12 can provide a mode switching function, the touch control in a left zone can provide an application selection function, the touch control in a right zone can provide a setting function, and the touch control in a lower zone can provide a communication function. It should be understood that the functions and the number of the zones described above are merely for illustration, and the present invention is not limited by the functions, the number and the division mode of the zones described above.

According to the embodiments of the present invention, different fingerprint authentication information corresponding to different zones 12 may be stored in the authentication unit, so that fingerprint authentication can be carried out independently in each zone 12. For example, the fingerprint authentication information corresponding to the right zone 12 which provides a setting function may be different from the fingerprint authentication information corresponding to the other zones 12. Therefore, a right to perform specific operation may be provided for a specific user individually. It can make touch control operation accompanied by fingerprint authentication more intelligent and improve safety to divide the touch area into a plurality of zones 12.

Figure 9:
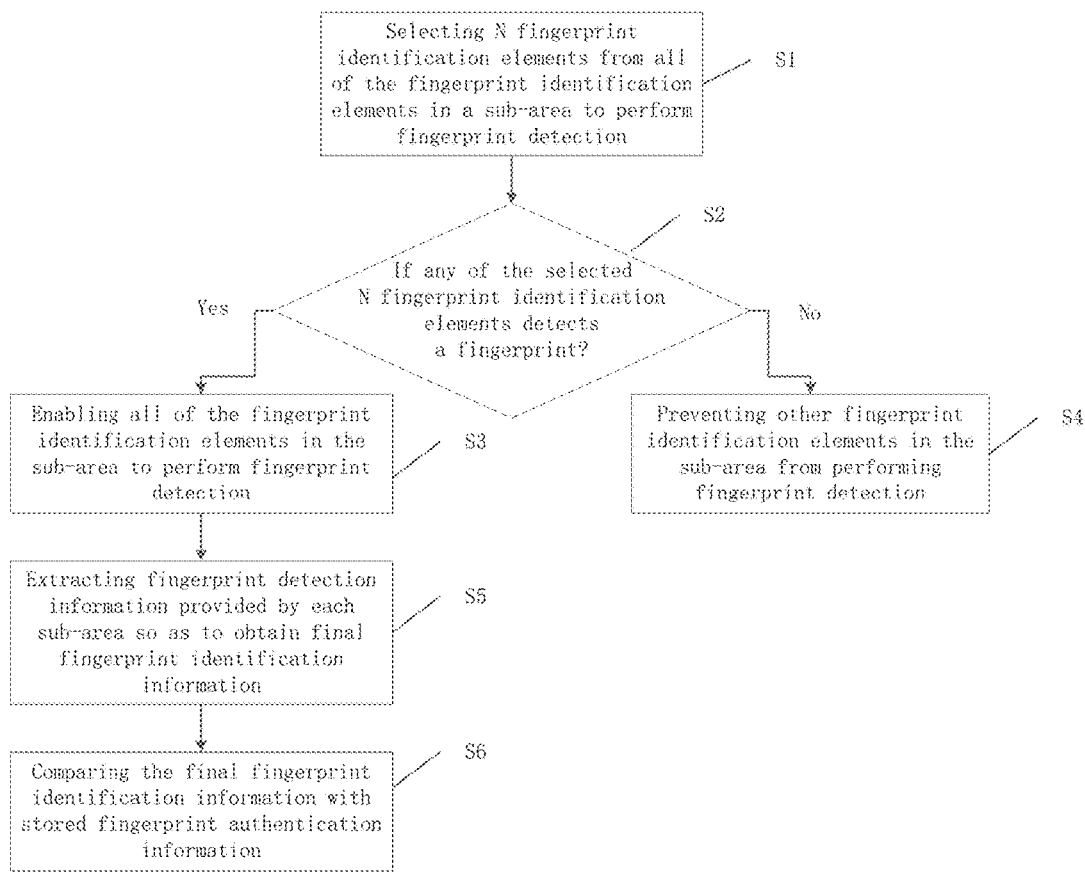
FIG. 9 is a flow diagram of a control method of a touch screen according to the embodiments of the present invention.

FIG. 9 is a flow diagram of a control method of a touch screen according to the embodiments of the present invention.

According to the embodiments of the present invention, the control method of a touch screen comprises steps of: independently identifying a fingerprint or a part of a fingerprint in each sub-area by the fingerprint identification elements located in the sub-area; and performing touch display through the touch area.

As shown in FIG. 9, N fingerprint identification elements are selected from all of the fingerprint identification elements in each sub-area to perform fingerprint detection (Step S1). Judgment is made on if any of the selected N fingerprint identification elements detects a fingerprint (Step S2). When at least one of the selected N fingerprint identification elements detects a fingerprint ("yes" as a result in Step S2), all of the fingerprint identification elements in the sub-area are enabled to perform fingerprint detection (Step S3); when none of the selected N fingerprint identification elements detects a fingerprint ("no" as a result in Step S2), other fingerprint identification elements in the sub-area are prevented from performing fingerprint detection (Step S4). Fingerprint detection information provided by each sub-area is extracted so as to obtain final fingerprint identification information (Step S5). The final fingerprint identification information is compared with stored fingerprint authentication information (Step S6). When a result of the comparison indicates that the final fingerprint identification information is consistent with the fingerprint authentication information, touch control operation performed by a user on the touch screen is allowed; otherwise, the touch control operation performed by the user on the touch screen may be forbidden.

Specifically, Step S5 may comprise: when a fingerprint is located in only one sub-area, extracting fingerprint detection information of the sub-area so as to obtain final fingerprint identification information; when a fingerprint is located in two sub-areas, comparing areas of the fingerprint in the two sub-areas, merely extracting fingerprint detection information of the sub-area having a larger area of the fingerprint so as to obtain final fingerprint identification information when a ratio of an absolute value of a difference between the areas of the fingerprint in the two sub-areas to a total area of the fingerprint is greater than a preset threshold, or extracting and summarizing fingerprint detection information of the two sub-areas so as to obtain the final fingerprint identification information when the ratio of the absolute value of the difference between the areas of the fingerprint in the two sub-areas to the total area of the fingerprint is less than or equal to the preset threshold; and when a fingerprint is located in three or more sub-areas, extracting and summarizing fingerprint detection information of all of the sub-areas in which the fingerprint is located, so as to obtain final fingerprint identification information.

According to the embodiments of the present invention, the control method may further comprise steps of dividing the touch area into a plurality of zones which provide different touch functions, wherein, a part of the plurality of sub-areas are distributed in each zone; and independently performing fingerprint authentication in each zone.

The touch screen according to the present invention may be applied to various display devices which include (but are not limited to) a mobile phone, a tablet computer, a TV set, a monitor, a notebook computer, a digital photo frame, a navigator, and any other product or component having a touch display function.

It can be understood that the foregoing implementations are merely exemplary implementations adopted for describing the principle of the present invention, but the present invention is not limited thereto. Those of ordinary skill in the art can make various variations and improvements without departing from the spirit and essence of the present invention, and these variations and improvements shall be considered to fall into the protection scope of the present invention.

The invention claimed is:

1. A touch screen, comprising a touch area used for touch display, and a plurality of fingerprint identification sensors are provided in the touch area and are configured to identify a fingerprint,
   wherein, the touch area includes a plurality of sub-areas, and the fingerprint identification sensors located in each sub-area independently identify a fingerprint or a part of a fingerprint in the sub-area,
   wherein a first control circuit is arranged in each sub-area, and is configured to select N fingerprint identification sensors from all of the fingerprint identification sensors in the sub-area to perform fingerprint detection,
   wherein a second control circuit is arranged in the touch area, and is configured to extract fingerprint detection information provided by each sub-area so as to obtain final fingerprint identification information, and
   wherein when a fingerprint is located in only one sub-area, the second control circuit extracts fingerprint detection information of the sub-area so as to obtain final fingerprint identification information;
   when a fingerprint is located in two sub-areas, the second control circuit compares areas of the fingerprint in the two sub-areas, when a ratio of an absolute value of a difference between areas of the fingerprint in the two sub-areas to a total area of the fingerprint is greater than a preset threshold, the second control circuit merely extracts fingerprint detection information of the sub-area having a larger area of the fingerprint so as to obtain final fingerprint identification information, when the ratio of the absolute value of the difference between the areas of the fingerprint in the two sub-areas to the total area of the fingerprint is less than or equal to the preset threshold, the second control circuit extracts and summarizes fingerprint detection information of the two sub-areas so as to obtain the final fingerprint identification information; and
   when a fingerprint is located in three or more sub-areas, the second control circuit extracts and summarizes fingerprint detection information of all of the sub-areas in which the fingerprint is located, so as to obtain final fingerprint identification information.

2. The touch screen of claim 1, wherein, each sub-area has such a size that a fingerprint of one finger can be accommodated in the sub-area.

3. The touch screen of claim 1, wherein
   when at least one of the selected N fingerprint identification sensors detects a fingerprint, the first control circuit controls all of the fingerprint identification sensors in the sub-area to perform fingerprint detection, and
   when none of the selected N fingerprint identification sensors detects a fingerprint, the first control circuit controls other fingerprint identification sensors in the sub-area not to perform fingerprint detection.

4. The touch screen of claim 3, wherein, the N fingerprint identification sensors are uniformly distributed in the sub-area, $9 \leq N \leq 12$, and N is an integer.

5. The touch screen of claim 1, further comprising an authentication circuitry, which is connected to the second control circuit, and is configured to compare the final fingerprint identification information obtained by the second control circuit with fingerprint authentication information stored in the authentication circuitry.

6. The touch screen of claim 1, wherein, each fingerprint identification sensor comprises fingerprint identification electrodes,
   a capacitance signal produced between the fingerprint identification electrode and a finger pressed thereon is the fingerprint detection information, and
   a fingerprint image generated based on the fingerprint detection information is the final fingerprint identification information.

7. The touch screen of claim 6, further comprising touch electrodes arranged in a matrix including a plurality of rows and a plurality of columns, and the fingerprint identification electrodes are the touch electrodes.

8. The touch screen of claim 7, wherein, when no fingerprint collection is carried out, the touch electrodes in every n rows are used for collecting a touch signal within a touch period, wherein 8≤n≤10, and n is an integer.

9. The touch screen of claim 6, wherein, the fingerprint identification electrode is rectangular, and the sides thereof fall within a size range of 50 μm to 200 μm.

10. The touch screen of claim 5, wherein, the touch area includes a plurality of zones which provide different touch functions, and a part of the plurality of sub-areas are distributed in each zone, and wherein, fingerprint authentication information corresponding to each zone is stored in the authentication circuitry.

11. A display device, comprising the touch screen of claim 1.

12. A control method of a touch screen, wherein, the touch screen comprises a touch area which is provided with a plurality of fingerprint identification sensors and is divided into a plurality of sub-areas, and the method comprises steps of:

independently identifying a fingerprint or a part of a fingerprint in each sub-area by the fingerprint identification sensors located in the sub-area;

selecting N fingerprint identification sensors from all of the fingerprint identification sensors in the sub-area to perform fingerprint detection; and performing touch display through the touch area, wherein the control method further comprises a step of: extracting fingerprint detection information provided by each sub-area so as to obtain final fingerprint identification information, and wherein the step of extracting fingerprint detection information provided by each sub-area comprises:

when a fingerprint is located in only one sub-area, extracting fingerprint detection information of the sub-area so as to obtain final fingerprint identification information;

when a fingerprint is located in two sub-areas, comparing areas of the fingerprint in the two sub-areas, merely extracting fingerprint detection information of the sub-area having a larger area of the fingerprint so as to obtain final fingerprint identification information when a ratio of an absolute value of a difference between the areas of the fingerprint in the two sub-areas to a total area of the fingerprint is greater than a preset threshold, or extracting and summarizing fingerprint detection information of the two sub-areas so as to obtain the final fingerprint identification information when the ratio of the absolute value of the difference between the areas of the fingerprint in the two sub-areas to the total area of the fingerprint is less than or equal to the preset threshold; and when a fingerprint is located in three or more sub-areas, extracting and summarizing fingerprint detection information of all of the sub-areas in which the fingerprint is located, so as to obtain final fingerprint identification information.

13. The control method of claim 12, wherein, each sub-area has such a size that a fingerprint of one finger can be accommodated in the sub-area.

14. The control method of claim 12, wherein, the step of independently identifying a fingerprint or a part of a fingerprint in each sub-area by the fingerprint identification sensors located in the sub-area comprises:

enabling all of the fingerprint identification sensors in the sub-area to perform fingerprint detection when at least one of the selected N fingerprint identification sensors detects a fingerprint; and preventing other fingerprint identification sensors in the sub-area from performing fingerprint detection when none of the selected N fingerprint identification sensors detects a fingerprint.

15. The control method of claim 14, wherein, the N fingerprint identification sensors are uniformly distributed in the sub-area, 9≤N≤12, and N is an integer.

16. The control method of claim 12, further comprising a step of:

comparing the obtained final fingerprint identification information with stored fingerprint authentication information.

* * * * *